United States Patent
Izawa

(10) Patent No.: US 8,106,999 B2
(45) Date of Patent: Jan. 31, 2012

(54) FOCUS ADJUSTMENT APPARATUS, METHOD, AND PROGRAM

(75) Inventor: Katsutoshi Izawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 889 days.

(21) Appl. No.: 12/111,821

(22) Filed: Apr. 29, 2008

(65) Prior Publication Data

US 2008/0278587 A1 Nov. 13, 2008

(30) Foreign Application Priority Data

May 10, 2007 (JP) ................. 2007-125293

(51) Int. Cl.
*G03B 13/00* (2006.01)
*H04N 5/232* (2006.01)

(52) U.S. Cl. ............... 348/349; 348/333.02; 348/346; 348/353

(58) Field of Classification Search ........... 348/345–357
See application file for complete search history.

(56) References Cited

U.S. PATENT DOCUMENTS

| | | | |
|---|---|---|---|
| 6,895,181 B2 * | 5/2005 | Nonaka et al. | 396/125 |
| 7,733,412 B2 * | 6/2010 | Takayama | 348/349 |
| 2004/0207743 A1 * | 10/2004 | Nozaki et al. | 348/333.12 |
| 2009/0284645 A1 | 11/2009 | Nozaki et al. | |

FOREIGN PATENT DOCUMENTS

| | | |
|---|---|---|
| JP | 2001-215403 A | 8/2001 |
| JP | 2002-6203 A | 1/2002 |
| JP | 2002-162559 A | 6/2002 |
| JP | 2003-107335 A | 4/2003 |
| JP | 2005-128156 A | 5/2005 |
| JP | 2008-61157 A | 3/2008 |

OTHER PUBLICATIONS

Chinese Office Action dated May 5, 2011, for corresponding Chinese Application No. 200810096174.7 and the English language translation is enclosed herewith.

* cited by examiner

*Primary Examiner* — Ngoc-Yen Vu
(74) *Attorney, Agent, or Firm* — Birch, Stewart, Kolasch & Birch, LLP

(57) ABSTRACT

A focus adjustment apparatus including a face detector for detecting a person's face included in an image obtained by photographing, an eye detector for detecting an eye of the person included in the image, an evaluation value calculator for calculating an evaluation value representing the depth of field at the position of the detected face, and a focus adjuster for selectively performing the following based on the evaluation value: (a) performing focus adjustment to bring at least the detected face into focus, and (b) causing the eye detector to detect an eye of the person and performing focus adjustment to bring the detected eye into focus.

7 Claims, 8 Drawing Sheets

FOCUS ADJUSTMENT APPARATUS, METHOD, AND PROGRAM

BACKGROUND OF THE INVENTION

1. Field of the Invention

The present invention relates to a focus adjustment apparatus and method that performs focus adjustment in a photographing device, such as a digital camera or the like. The invention is further directed to a computer readable recording medium on which a program for causing a computer to perform the focus adjustment method is recorded.

2. Description of the Related Art

When photographing a person, such as photographing a portrait or the like, the image obtained by the photographing will give a blurred impression if the eyes are not brought into focus even though the focus is on the contour of the nose or cheek. For this reason, when photographing a person, it is said that bringing the eyes into focus is a basic practice. In order to bring the eyes into focus, photographing devices having functions to detect the face and eyes of a person from the image to be photographed, and to bring the eyes into focus are proposed as described, for example, in Japanese Unexamined Patent Publication Nos. 2001-215403, 2002-006203, and 2003-107335. Recently, a photographing device capable of detecting a face from the image to be photographed and photographing the detected face appropriately has also been proposed. Further, in a photographing device having face detection capabilities, a method for further detecting the eyes from the detected face and bringing the detected eyes into focus is proposed as described, for example, in Japanese Unexamined Patent Publication No. 2005-128156.

The photographing devices described in Japanese Unexamined Patent Publication Nos. 2001-215403, 2002-006203, 2003-107335, and 2005-128156, however, have problems that they require a considerable time and large power consumption for focus adjustment, since they invariably detect eyes after detecting a face.

SUMMARY OF THE INVENTION

The present invention has been developed in view of the circumstances described above, and it is an object of the present invention to enable an efficient focus adjustment, in particular, when photographing a person.

A focus adjustment apparatus according to the present invention is an apparatus including:

a face detection means for detecting a person's face included in an image obtained by photographing;

an eye detection means for detecting an eye of the person included in the image;

an evaluation value calculation means for calculating an evaluation value representing the depth of field at the position of the detected face; and a focus adjustment means for selectively performing the following based on the evaluation value: (a) performing focus adjustment to bring at least the detected face into focus, or (b) causing the eye detection means to detect an eye of the person and performing focus adjustment to bring the detected eye into focus.

Here, the term "at least" means to include a case in which not only the face or eyes are brought into focus but also other portions of the person other than the face or eyes, for example, the head, nose, and the like are brought into focus, along with the face or eyes.

The focus adjustment apparatus of the present invention may further include a face orientation determination means for determining an orientation of the face, and the focus adjustment means may be a means, when causing the eye detection means to detect an eye of the person, for determining the eye to be brought into focus according to the orientation of the face.

Further, the focus adjustment apparatus of the present invention may further include a face orientation determination means for determining an orientation of the face, and the eye detection means may be a means, when detecting an eye of the person, for setting an area for detecting the eye, and detecting the eye within the determined area.

Still further, in the focus adjustment apparatus of the present invention, the evaluation value calculation means may a means for calculating the evaluation value based on information of at least one of the focal length, aperture value, distance to in-focus position of a lens constituting the photographing means and the size of the face.

Further, in the focus adjustment apparatus of the present invention, when a plurality of faces is detected, the face detection means may be a means for determining one of the faces to be brought into focus.

A focus adjustment method according to the present invention is a method including the steps of:

detecting a person's face included in an image obtained by photographing;

calculating an evaluation value representing the depth of field at the position of the detected face; and selectively performing the following based on the evaluation value: (a) performing focus adjustment to bring at least the detected face into focus, or (b) detecting an eye of the person and performing focus adjustment to bring the detected eye into focus.

Further, the focus adjustment method of the present invention may be provided in the form of a program, recorded on a computer readable recording medium, for causing a computer to perform the method.

Where the depth of field is shallow, the image will give a blurred impression if the focus is not on the eyes. On the contrary, where the depth of field is deep, the image will not give a blurred impression even if the focus is not on the eyes but only on the face.

According to the present invention, an evaluation value representing the depth of field at the position of a detected face is calculated, and the following is selectively performed based on the evaluation value: performing focus adjustment to bring at least the detected face into focus, or detecting an eye of the person and performing focus adjustment to bring the detected eye into focus Thus, the eye detection and focus adjustment to bring the detected eye into focus are performed only when the depth of field is shallow, unlike in the methods described in the aforementioned patent publications in which both the face detection and eye detection are invariably performed. Consequently, where the depth of field is deep, and hence eye detection is not performed, the processing time and power consumption required for the focus adjustment may be reduced.

Further, by determining the orientation of a detected face, and determining the eye to be brought into focus, more suitable eye may be brought into focus, in particular, in the case where the face is slightly oriented to the side and the both eyes are detected, thereby an image that does not give a blurred impression may be obtained.

Still further, by determining the orientation of a detected face, and setting an eye detection area according to the determined face orientation, the eye detection may be performed efficiently, in particular, in the case where the face is slightly oriented to the side, thereby a processing time for the focus adjustment may be further reduced.

DESCRIPTION OF THE PREFERRED EMBODIMENTS

Figure 1:
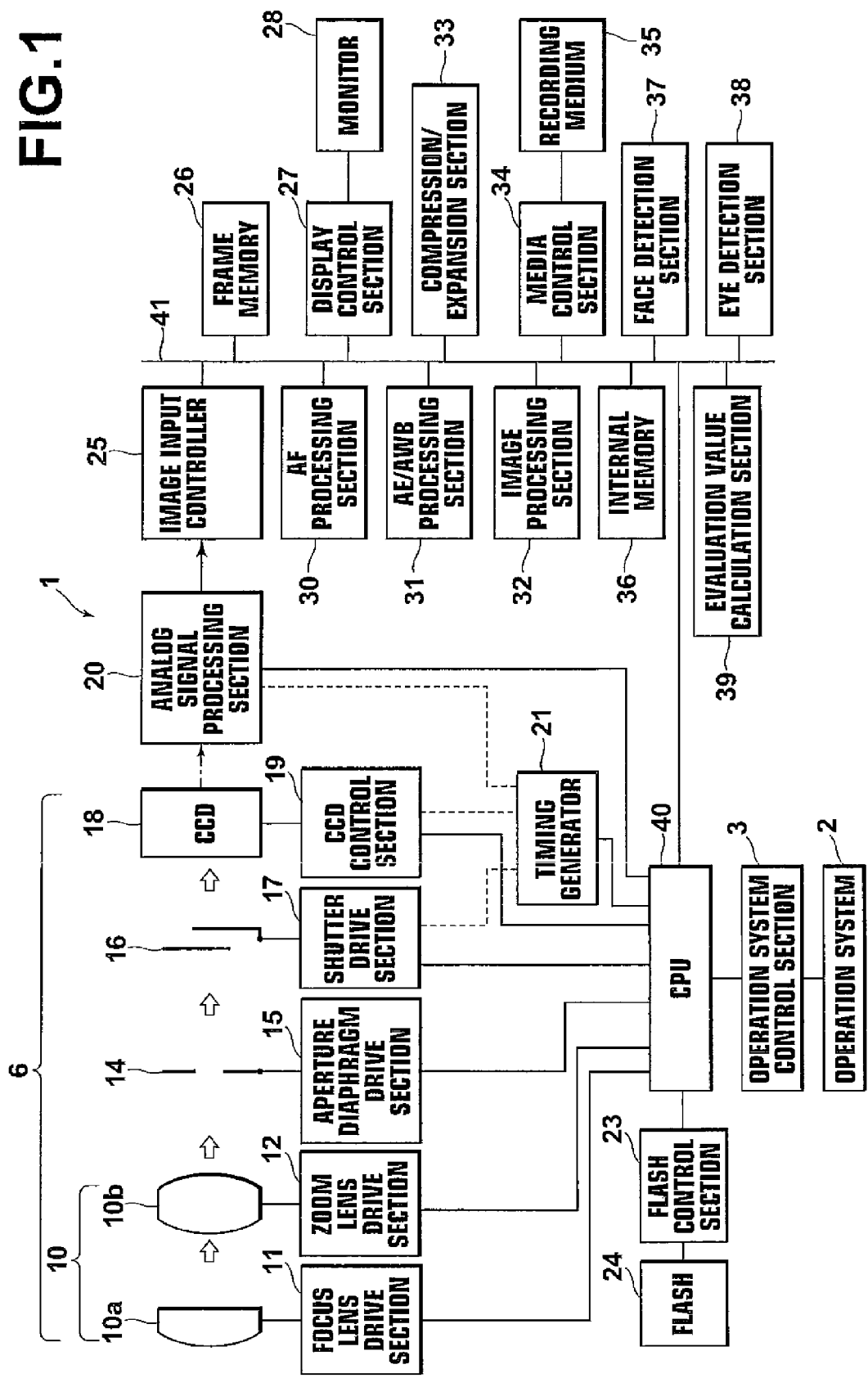
FIG. 1 is a schematic block diagram of a digital camera to which a focus adjustment apparatus according to a first embodiment of the present invention is applied, illustrating the construction thereof.

Hereinafter, exemplary embodiments of the present invention will be described with reference to the accompanying drawings. FIG. 1 is a schematic block diagram of a digital camera to which a focus adjustment apparatus according to a first embodiment of the present invention is applied, illustrating the construction thereof. As shown in FIG. 1, the digital camera 1 according to the first embodiment includes an operation system 2 having an operation mode switch, a zoom-lever, an up-down and right-left button, a release button, a power switch, and the like, and an operation system control section 3, which is an interface section for transferring operational contents of the operation system 2 to a CUP 40.

The imaging system 6 includes a focus lens 10a and a zoom lens 10b that constitute a taking lens 10. The respective lenses are movable in the optical axis directions by a focus lens drive section 11 and a zoom-lens drive section 12 respectively, each of which including a motor and a motor driver. The focus lens drive section 11 controls movement of the focus lens 10a based on focus drive amount data outputted from an AF processing section 30. The zoom-lens drive section 12 controls movement of the zoom-lens 10b based on data of operated amount of the zoom-lever.

An aperture diaphragm 14 is driven by an aperture diaphragm drive section 15 that includes a motor and a motor driver. The aperture diaphragm drive section 15 controls the aperture diameter of the aperture diaphragm based on aperture value data outputted from an AEF/AWB processing section 31.

A shutter 16 is a mechanical shutter, and is driven by a shutter drive section 17 which includes a motor and a motor driver. The shutter drive section 17 performs open/close control of the shutter 16 according to a signal generated by the depression of the release button and shutter speed data outputted from the AE/AWB processing section 31.

A CCD 18, which is an image sensor, is provided on the rear side of the optical system. The CCD 18 has a photoelectric surface that includes multitudes of light receiving elements disposed two-dimensionally, and the light representing a subject image transmitted through the optical system is focused on the photoelectric surface and subjected to a photoelectric conversion. A microlens array for directing light to respective pixels, and a color filter array including R, G, and B filters arranged regularly are disposed in front of the photoelectric surface. The CCD 18 outputs charges stored in the respective pixels line by line as serial analog image signals in synchronization with a vertical transfer clock signal and a horizontal transfer clock signal supplied from a CCD control section 19. The charge storage time of each pixel, that is, exposure time is determined by an electronic shutter drive signal supplied from the CCD control section 19. The CCD 18 is gain-adjusted by the CCD control section 19 so that an analog image signal having a predetermined level is obtained.

The analog image signals outputted from the CCD 18 are inputted to an analog signal processing section 20. The analog signal processing section 20 includes: a correlated double sampling circuit (CDS) for removing noise from the analog signals; an automatic gain controller (ACC) for controlling the gain of the analog signals; and an A/D converter (ADC) for converting the analog signals to digital signals. Hereinafter, processing performed by the analog signal processing section 20 is referred to as the "analog signal processing". The image data converted to digital signals are CCD-RAW data in which each pixel has RGB density values.

A timing generator 21 is a generator for generating timing signals, which are inputted to the shutter drive section 17, CCD control section 19, and analog signal processing section 20, thereby the operation of the release button, open/close of the shutter 16, charge acquisition of the CCD 18, and the processing of the analog signal processing section 20 are synchronized.

A flash control section 23 causes a flash 24 to emit light at the time of photographing.

An image input controller 25 writes the CCD-RAW data, inputted from the analog signal processing section 20, into a frame memory 26.

The frame memory 26 is a work memory used when various types of image processing (signal processing), to be described later, are performed on the image data, and constituted, for example, by a SDRAM (Synchronous Dynamic Random Access Memory) that performs data transfer in synchronization with a bus clock signal having a constant frequency.

A display control section 27 is a control section for causing a liquid crystal monitor 28 to display the image data stored in the frame memory 26 as through images, or to display image data stored in the recording medium 35 when in playback mode. Through images are obtained in series by the CCD 18 at predetermined time intervals while the imaging mode is selected.

The AF processing section 30 and AE/AWB processing section 31 determine an imaging condition based on a pre-image. The pre-image is an image based on the image data stored in the frame memory 26 as a result of pre-imaging performed by the CCD 18, which is caused by the CPU 40 that has detected a halfway depression signal generated when the release button is depressed halfway.

The AF processing section 30 performs AF processing based on the pre-image. More specifically, a focus frame is set on a pre-image based on the position and size of a face or eyes detected from a through image, and a focus signal is calculated, which is an added total of high frequency signals obtained with respect to the focus frame while gradually moving the focus lens 10a from proximity to infinity. Then, the step position of the focus lens that gives the focus signal is determined to be the focus position. Where a plurality of focus frames is set, a largest focus signal value is obtained with respect to each focus frame, and the step position of the focus lens that gives the largest focus signal value is determined to be the focus position of each focus frame. Then, focus drive amount data for moving the focus lens 10a so as to come into focus on the focus position are outputted. Hereinafter, in the present embodiment, the processing after the focus frame is set is referred to as the focus adjustment.

The AE/AWB processing section 31 measures subject brightness based on the pre-image, determines ISO sensitivity, aperture value, shutter speed, and the like, and determines the ISO sensitivity data, aperture value data, and shutter speed data as an exposure setting value (AE processing), as well as automatically adjusting the white balance at the time of photographing (AWB processing).

The image processing section 32 performs image quality correction, such as gradation correction, sharpness correction, color correction, and the like on the image data of a final image. In addition, it performs YC processing in which CCD-RAW data are converted to Y data, which are luminance signal data, and YC data that include Cb data, which are blue chrominance difference signals, and Cr data, which are red chrominance difference signals. The term "final image" as used herein means an image based on image data picked up by the CCD 18 through a main photographing performed when the release button is fully depressed and stored in the frame memory 16 via the analog signal processing section 20 and the image input controller 25.

A compression/expansion processing section 33 generates, for example, a JPEG format image file by performing compression on the image data after image quality correction and conversion are performed by the image processing section 32. A tag that includes auxiliary information, such as the date and time of photographing, and the like stored based on, for example, Exif format or the like, is attached to the image file.

The media control section 34 gains access to the recording medium 35 to control read/write operations of the image files. An internal memory 36 stores various constants to be set within the digital camera 1, a program to be performed by the CPU 40, and the like.

A face detection section 37 detects a person's face from a through image. In addition, it also detects a person's face from a pre-image or a final image as required.

An eye detection section 38 detects eyes from a face detected by the face detection section 37.

An evaluation value calculation section 39 calculates an evaluation value with respect to the depth of field.

Operation of the face detection section 37, eye detection section 38, and evaluation calculation section 39 at the time of AF processing will be described later.

The CPU 40 controls each section of the main body of the digital camera 1 in response to the signals from various sections, including the operation system 2, AF processing section 30, and the like. In addition, it controls the face detection section 37 to detect a face region from a through image. Further, it controls the face detection section 37, eye detection section 38, evaluation calculation section 39, and AF processing section 30 to perform AF processing.

Figure 2:
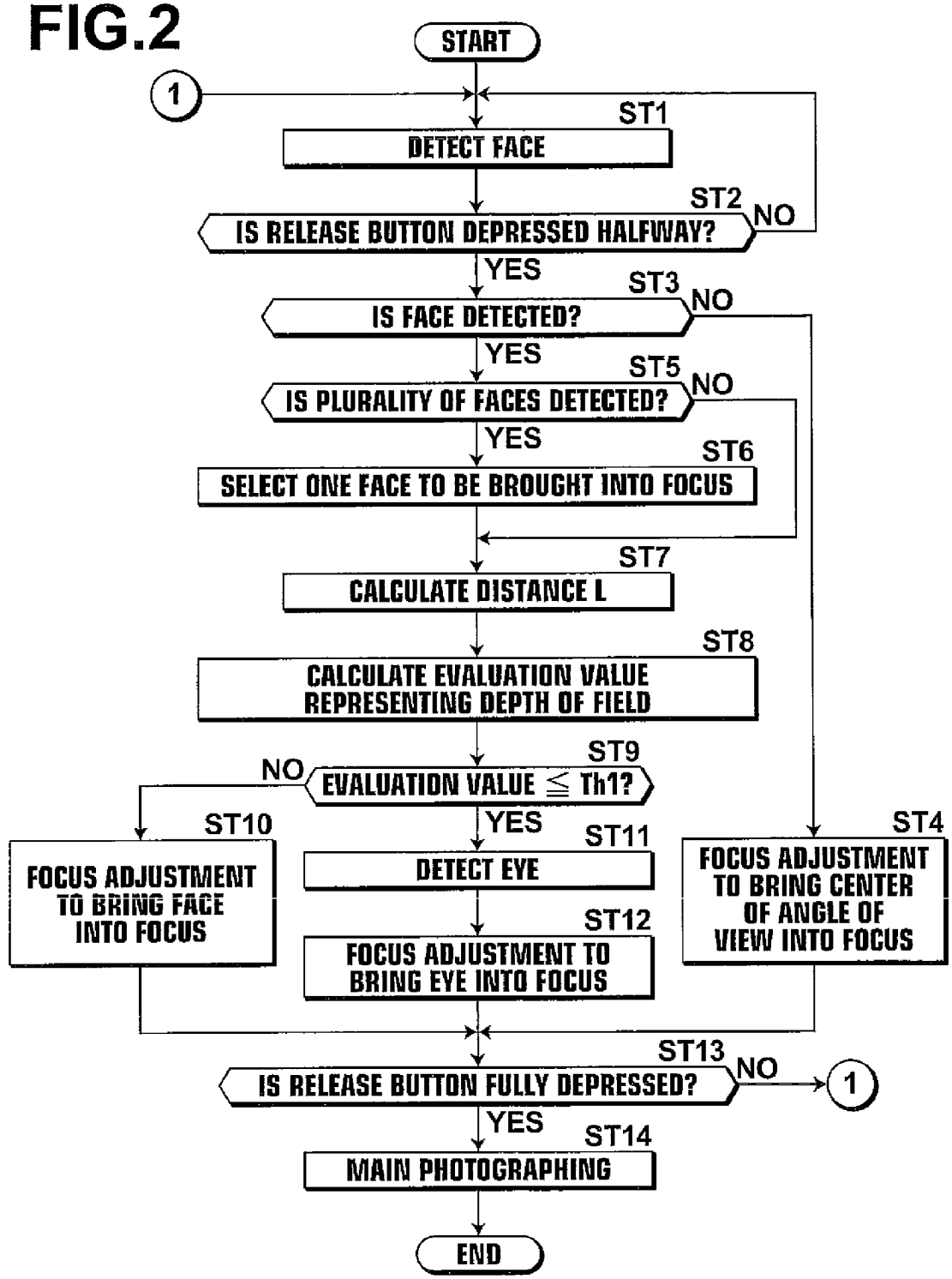
FIG. 2 is a flowchart of AF processing performed in the first embodiment.

A control procedure performed in the first embodiment will now be described. FIG. 2 is a flowchart of AF processing performed in the first embodiment. When power is supplied to the digital camera 1 and a through image is obtained, the procedure is initiated by the CPU 40, and the face detection section 37 detects a face from the through image (step ST1). Face detection results include the size and position information of a detected face. Where no face is detected, the detection results will represent information indicating that no face is present. The face detection section 37 detects all of the faces included in a through image.

Here, as the face detection method used herein is a method, in which a detection frame having a certain size is moved bit by bit on an image to calculate a characteristic amount from the image within the detection frame at each moved position, then a matching level with a predetermined face characteristic amount is calculated, and a position of the detection frame where the matching level becomes greater than or equal to a threshold value Th0 is detected as a face. Here, the change in the size of the detection frame allows detection of faces of different sizes.

Figure 3:
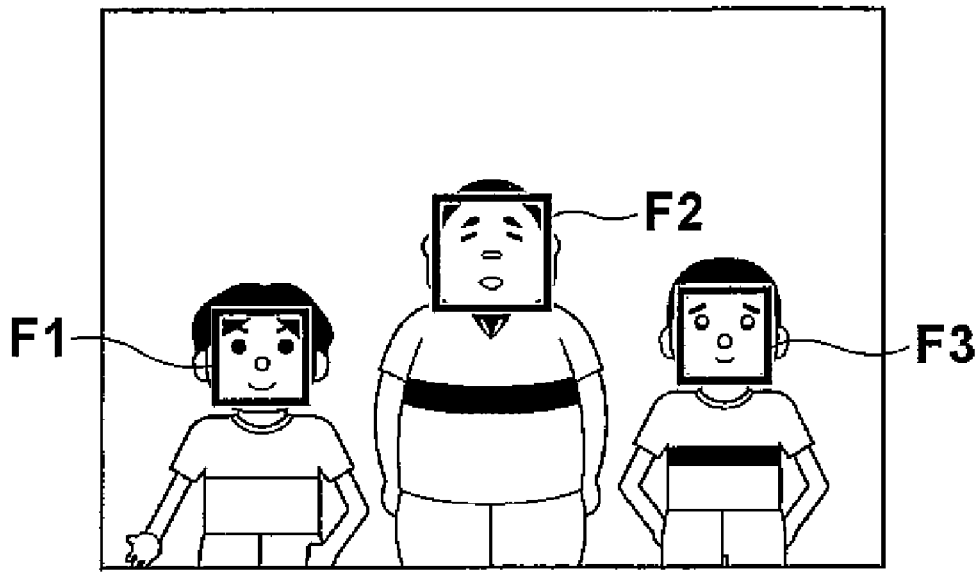
FIG. 3 illustrates how to detect a face region.

This may detect face regions F1 to F3 enclosed by rectangular detection frames from a through image as illustrated in FIG. 3. It is noted that the detection frame serves as the focus frame when focus adjustment processing is performed using a pre-image.

It will be appreciated that the face detection method is not limited to this, and any face detection method, such as a method that detects a rectangular region of an image having skin color and enclosing a face contour shape is detected as a face, a method that detects a region of an image having face contour shape is detected as a face, or the like, may be used.

Then, the CPU 40 determines whether or not the release button is depressed halfway (step ST2), and if step ST2 is negative, the procedure returns to step ST1. This will result in that a face is detected repeatedly from through images. If step ST2 is positive, a determination is made as to whether or not a face is detected (step ST3), and if step ST3 is negative, the AF processing section 30 sets the focus frame in the center of the angle of view and performs focus adjustment such that the center of the angle of view is brought into focus using a pre-image obtained by the half-way depression of the release button (step ST4). If step ST3 is positive, a determination is made as to whether or not a plurality of faces is detected (step ST5).

If step ST5 is positive, one of the detected faces is selected for focus adjustment (step ST6). More specifically, a face having a largest size or a face located closest to the center of an image is selected as the face for focus adjustment. This will result in the face F2 shown in FIG. 2 to be selected. Alternatively, a face having a highest matching level at the time of face detection may be selected. Next, the AF processing section 30 calculates the distance L between the digital camera 1 and the selected face based on the ratio of the selected face to the angle of view (step ST7). It is noted that when the step ST5 is negative, the procedure proceeds to step ST7.

The size of human faces does not vary so greatly from individual to individual, so that the ratio of the face to the angle of view changes substantially at a constant rate, not dependent upon individuals, with the distance from the digital camera 1. Accordingly, the distance L to the subject may be calculated based on the ratio of the detected face to the entire image. Where the digital camera 1 is preset to perform preliminary AF processing prior to the face detection, the distance L to the subject may be calculated based on the lens movement amount data calculated at that time.

Thereafter, the evaluation value calculation section 39 calculates an evaluation value representing the depth of field at the position of the face detected by the face detection section 37 based on the formula (1) below (step ST8).

$$DOF = \delta FL^2/(f^2 - \delta FL) - \delta FL^2/(f^2 + \delta FL) \qquad (1)$$

where, DOF is the depth of field, F is the aperture value, f is the focal length of the lens, and δ is the radius of permissible circle of confusion. Here, the aperture value, focal length of the lens, and radius of permissible circle of confusion are unique values to the digital camera 1 so that they may be stored in the internal memory 36 and used when calculating the evaluation value.

Here, it is noted that the depth of field, DOF, itself is used as the evaluation value representing the depth of field. But it is not limited to this, and any value may be used as long as it can represent the depth of field, DOF.

Then, the AF processing section 30 determines whether or not the evaluation value representing the depth of field is less than or equal to a predetermined threshold value Th1 (step ST9). The threshold value Th1 maybe, for example, 3 cm. If step ST9 is negative, the AF processing section 30 performs focus adjustment such that the face selected in step ST5 is brought into focus (step ST10). More specifically, the focus adjustment is performed using the face region F2 shown in FIG. 3 as the focus frame.

Figure 4:
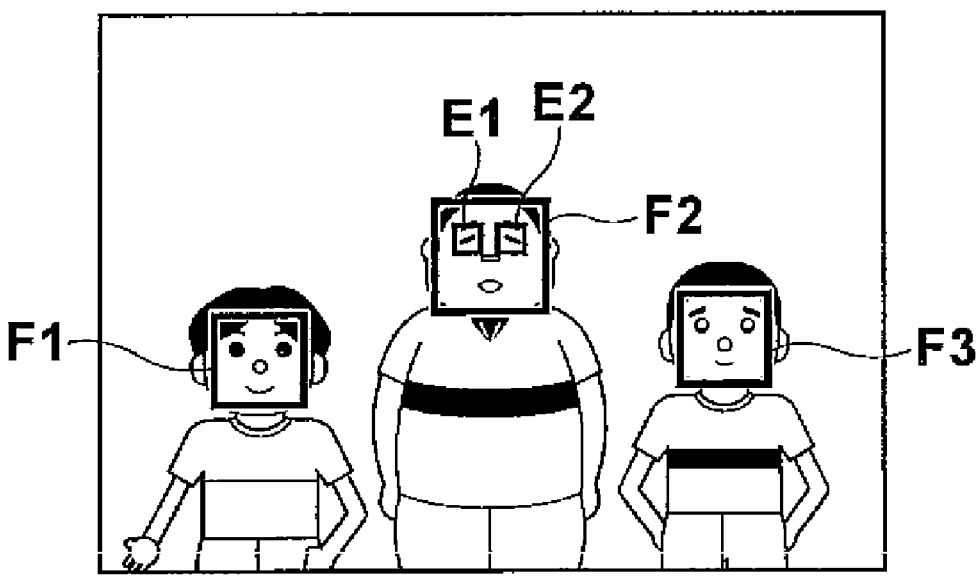
FIG. 4 illustrates how to detect eyes.

In the mean time, if step ST9 is positive, the eye detection section 38 detects the eyes included in the face detected in step ST6 (step ST11). More specifically, a rectangular eye pattern is moved bit by bit on an image within the target face region to calculate a matching level at each moved position, and coordinates of the position of the pattern where the matching level becomes greater than or equal to a predetermined threshold value Th2 is detected as an eye. This will result in that eye regions E1 and E2 are detected within the face region F2, as shown in FIG. 4.

Then, the AF processing section 30 performs focus adjustment such that the detected eyes are brought into focus (step ST12). More specifically, the focus adjustment is performed using the eye regions E1 and E2 detected within the face region F2 as the focus frames, as shown in FIG. 4.

Following step ST4, step ST10, or step ST12, the CPU 40 determines whether or not the release button is depressed fully (step ST13). If step ST13 is negative, the procedure returns to step ST1. While, if step ST13 is positive, main photographing is performed (step ST14), and the procedure is terminated. The CCD-RAW data obtained by the main photographing are processed by the image processing section 32. Then, the compression/expansion processing section 33 performs compression on the processed CCD-RAW data in JPEG compression format or the like to generate an image file. The generated image file is recorded on the recording medium 35 by the media control section 34.

Where the depth of field is shallow, the image will give a blurred impression if the focus is not on the eyes. On the contrary, where the depth of field is deep, the image will not give a blurred impression even if the focus is not on the eyes but only on the face.

According to the first embodiment, an evaluation value representing the depth of field at the position of a detected face is calculated, and the following is selectively performed based on the evaluation value: performing focus adjustment to bring the detected face into focus, or further perform eye detection with the eye detection section 38 and bring the detected eye into focus. Thus, the eye detection and focus adjustment to bring the detected eye into focus are performed only when the depth of field is shallow, unlike in the methods described in aforementioned patent publications in which both the face detection and eye detection are invariably performed. Consequently, where the depth of field is deep, and hence eye detection is not performed, the processing time and power consumption required for the AF processing may be reduced.

Figure 5:
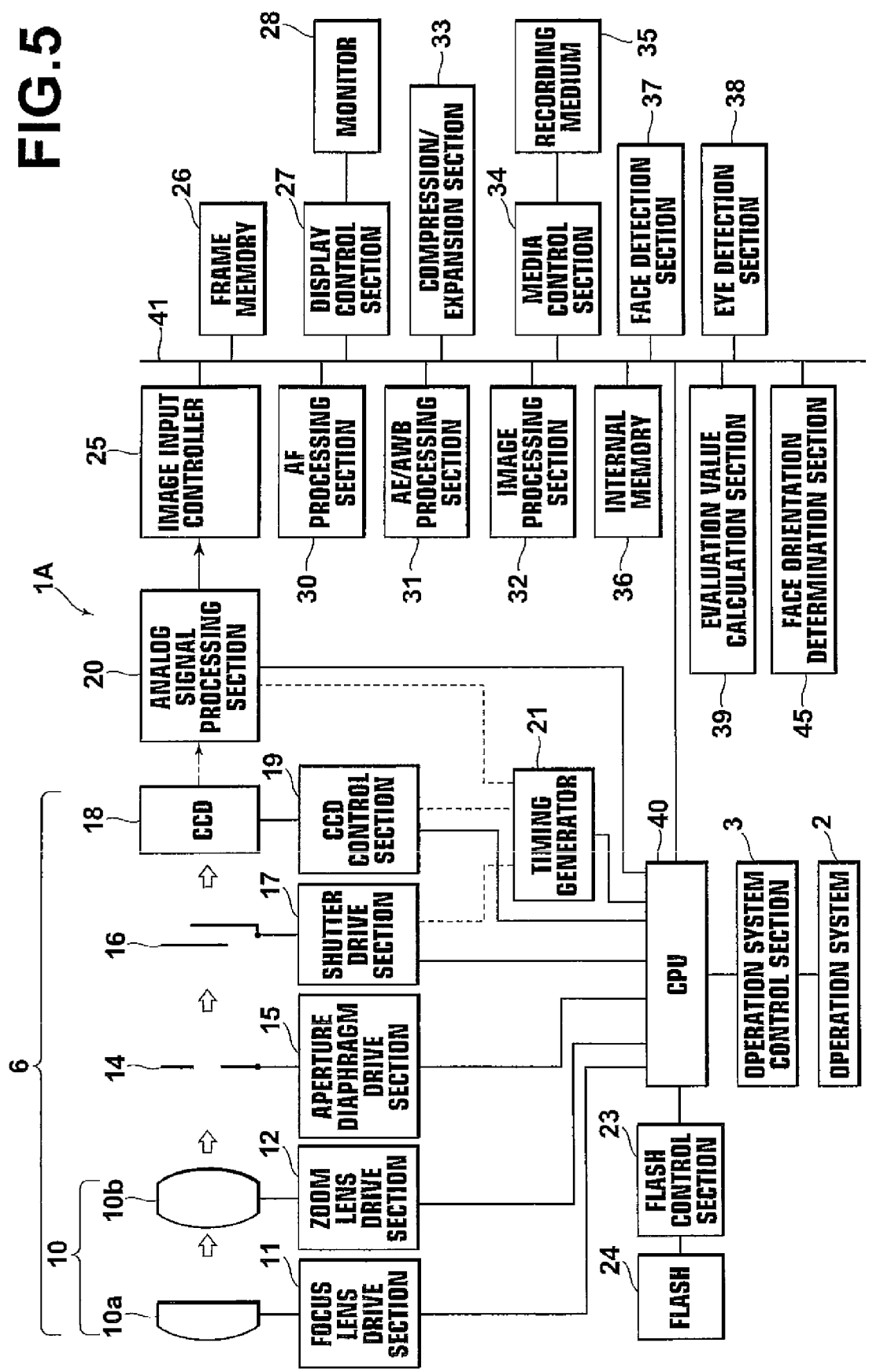
FIG. 5 is a schematic block diagram of a digital camera to which a focus adjustment apparatus according to a second embodiment of the present invention is applied, illustrating the construction thereof.

Next, a second embodiment of the present invention will be described. FIG. 5 is a schematic block diagram of a digital camera to which a focus adjustment apparatus according to a second embodiment of the present invention is applied, illustrating the construction thereof. In the second embodiment, components identical to those in the first embodiment are given the same reference numerals and will not be elaborated upon further here. The digital camera 1A according to the second embodiment differs from the digital camera 1 according to the first embodiment in that the face detection section 37 further includes a face orientation determination section 45 for determining the orientation of a detected face.

Figure 6:
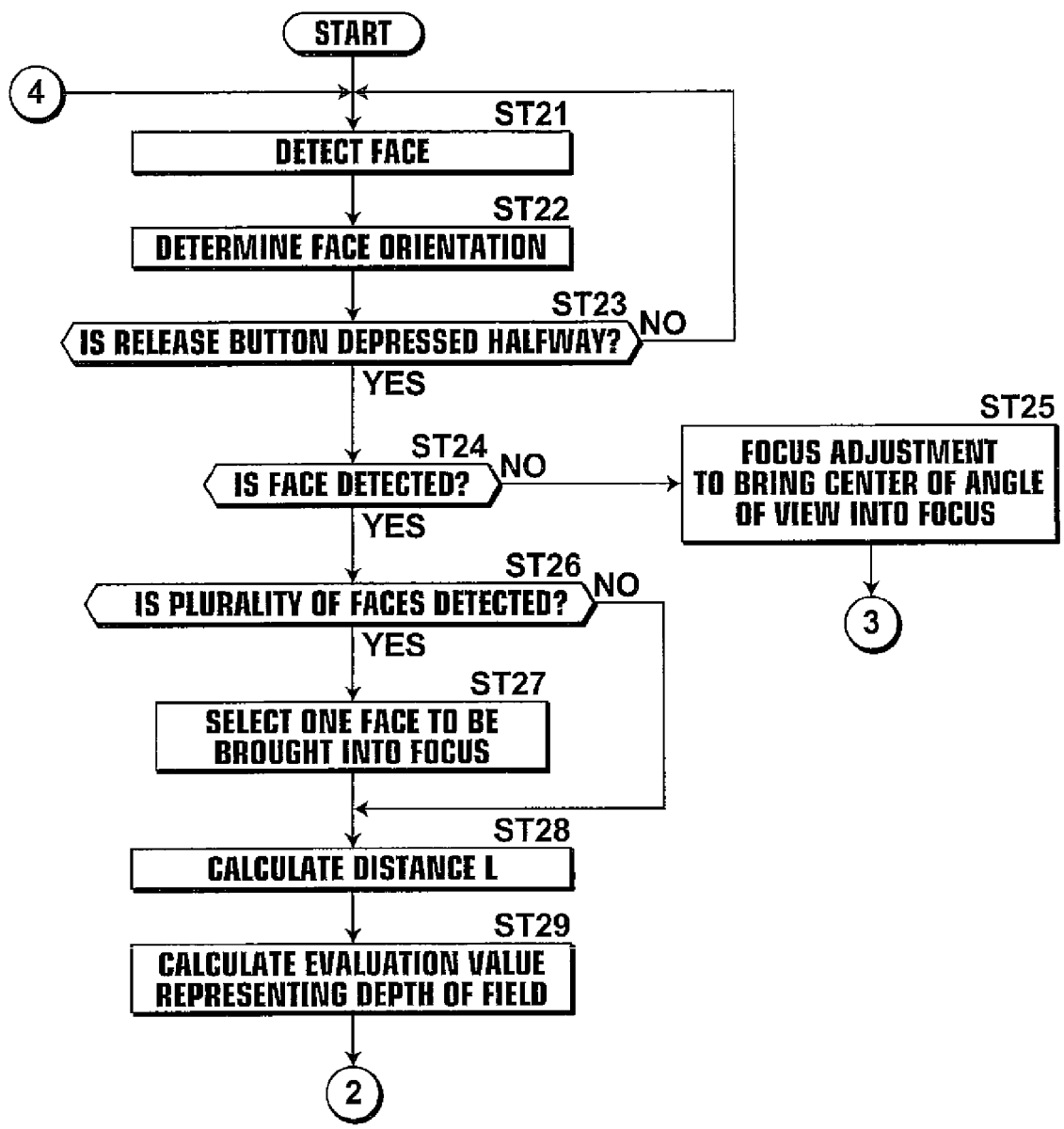
FIG. 6 is a flowchart of AF processing performed in the second embodiment (part 1).
Figure 7:
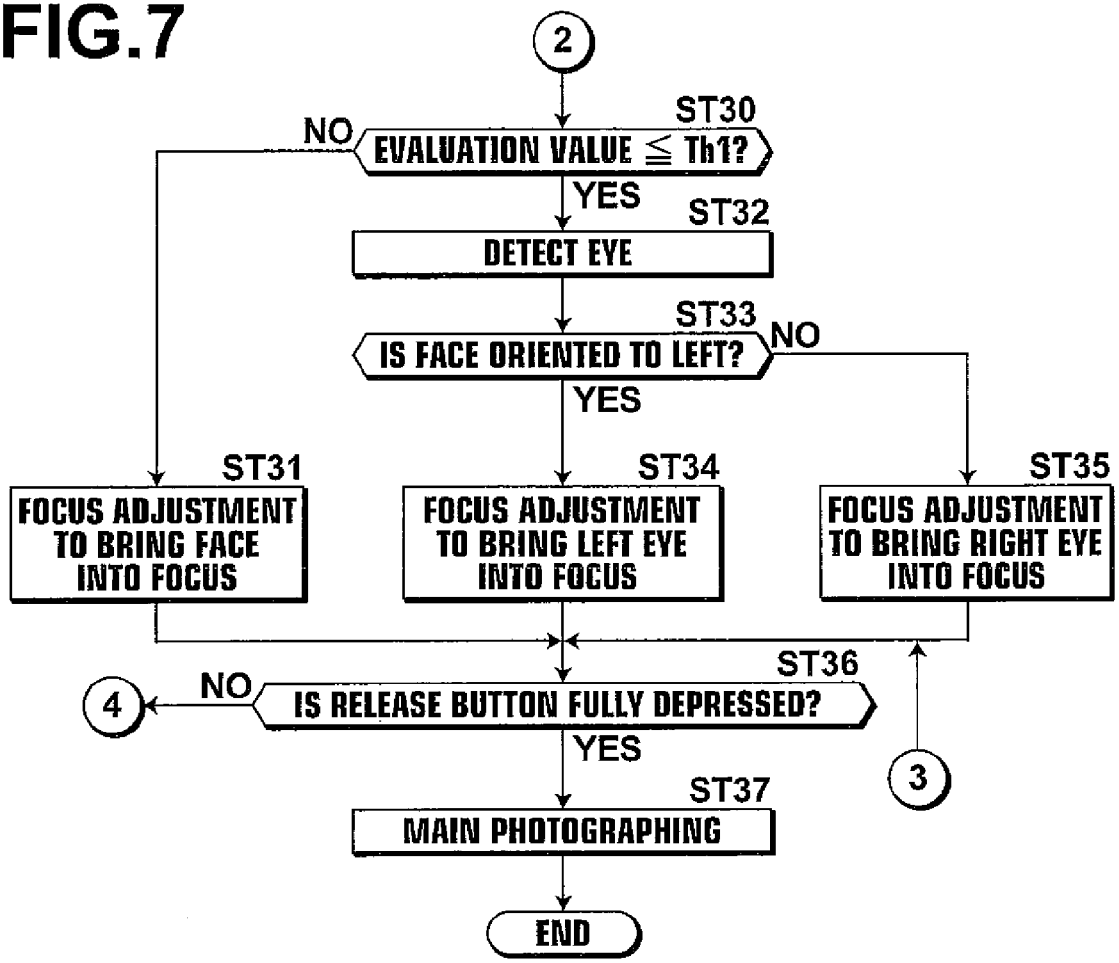
FIG. 7 is a flowchart of AF processing performed in the second embodiment (part 2).

A control procedure performed in the second embodiment will now be described. FIGS. 6 and 7 illustrate a flowchart of AF processing performed in the second embodiment. When power is supplied to the digital camera 1A and a through image is obtained, the procedure is initiated by the CPU 40, and the face detection section 37 detects a face from the through image (step ST21).

Figure 8:
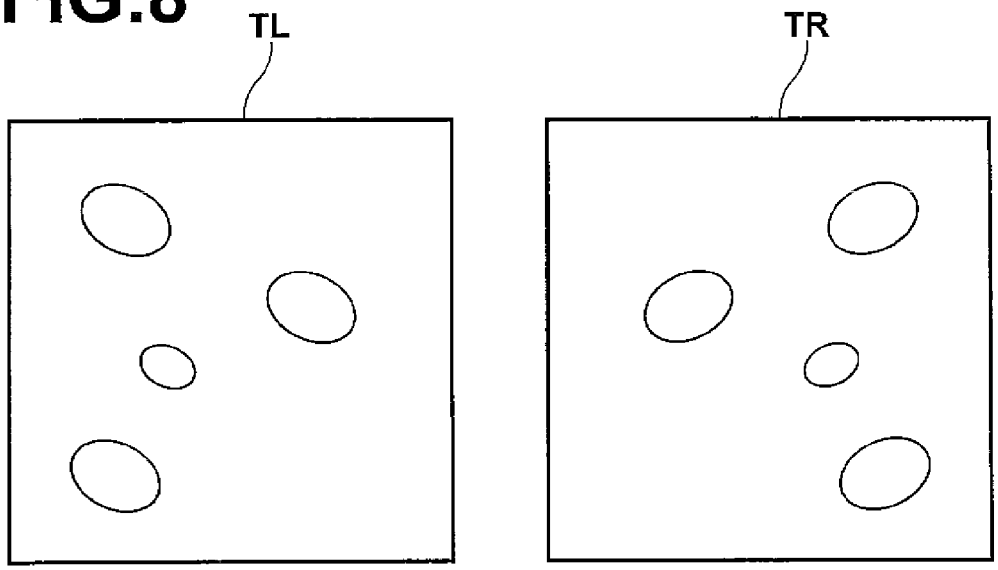
FIG. 8 illustrates templates for determining orientation of faces.

Then, the face orientation determination section 45 determines the orientation of the face detected by the face detection section 37 (step ST22). More specifically, template matching of a left oriented face detection template TL and a right oriented face detection template TR shown in FIG. 8 with the detected face is performed, and a face orientation corresponding to the template with a greater matching level is determined to be the orientation of the detected face. The templates TL and TR have signal values according to the characteristic amounts of left-oriented and right-oriented faces respectively, which are calculated through a learning process of multitudes of faces and stored in the internal memory 36 in advance.

Then, the CPU 40 determines whether or not the release button is depressed halfway (step ST23), and if step ST23 is negative, the procedure returns to step ST21. This will result in that a face is detected repeatedly from through images. If step ST23 is positive, a determination is made as to whether or not a face is detected (step ST24), and if step ST24 is negative, the AF processing section 30 performs focus adjustment such that the center of the angle of view is brought into focus (step ST25). If step ST24 is positive, a determination is made as to whether or not a plurality of faces is detected (step ST26).

If step ST26 is positive, one of the detected faces is selected for focus adjustment (step ST27). Then, the AF processing section 30 calculates the distance L between the digital camera 1A and the selected face from the ratio of the selected face to the angle of view (step ST28). If step ST26 is negative, the procedure proceeds to step ST28.

Thereafter, the evaluation value calculation section 39 calculates an evaluation value representing the depth of field at the position of the face detected by the face detection section 37 based on the formula (1) above (step ST29).

Then, the AF processing section 30 determines whether or not the evaluation value representing the depth of field is less than or equal to the predetermined threshold value Th1 (step ST30). If step ST30 is negative, the AF processing section 30 performs focus adjustment such that the face selected in step ST27 is brought into focus (step ST31).

In the mean time, if step ST30 is positive, the eye detection section 38 detects the eyes included in the face detected in step ST27 (step ST32). Then, the AF processing section 30 determines whether or not the orientation of the face is left (step ST33). If step ST33 is positive, the focus adjustment is performed such that the left eye is brought into focus (step ST34). While, if step ST33 is negative, the focus adjustment is performed such that the right eye is brought into focus (step ST35).

Following step ST25, step ST31, step ST34, or step ST35, the CPU 40 determines whether or not the release button is depressed fully (step ST36). If step ST36 is negative, the procedure returns to step ST21. While, if step ST36 is positive, main photographing is performed (step ST37), and the procedure is terminated.

In this way, in the second embodiment, the orientation of a detected face is determined, and the eye to be brought into focus is determined according to the face orientation. This allows more suitable eye to be brought into focus, in particular, in the case where the face is slightly oriented to the side and the both eyes are detected, thereby an image that does not give a blurred impression may be obtained.

Next, a third embodiment of the present invention will be described. A digital camera according to the third embodiment has identical construction to that of the digital camera 1A according to the second embodiment, and only the control procedure performed is different therefrom so that the construction will not be elaborated upon further here.

Figure 9:
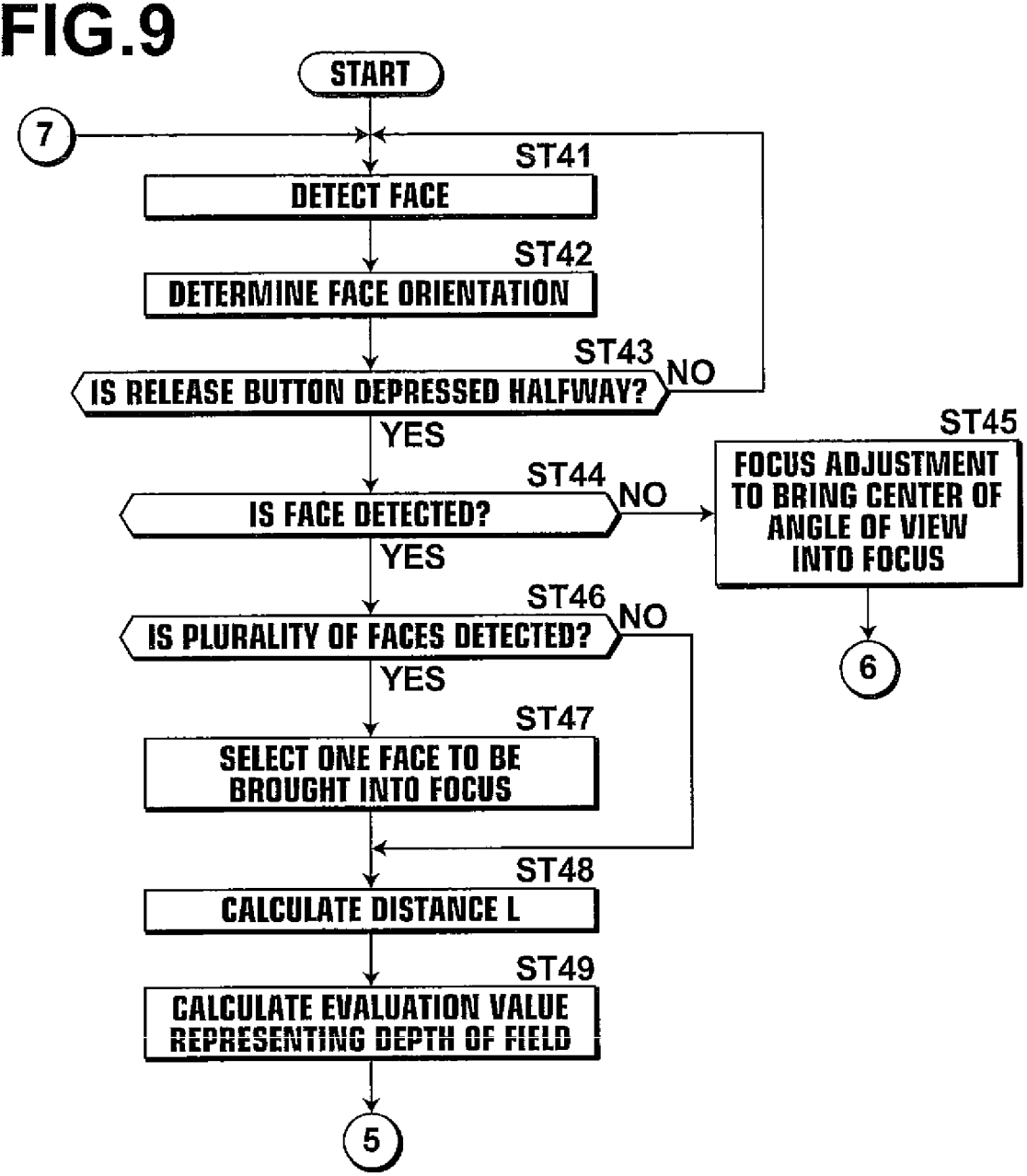
FIG. 9 is a flowchart of AF processing performed in a third embodiment (part 1).
Figure 10:
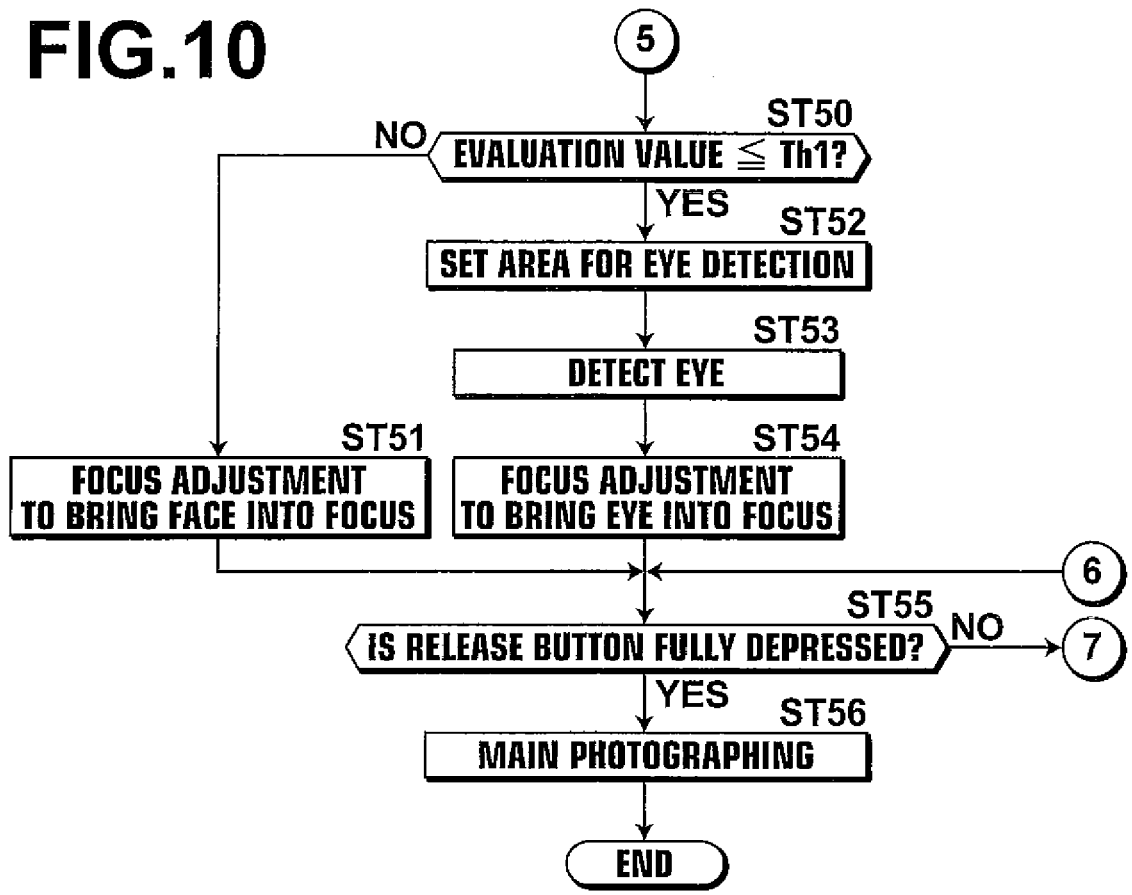
FIG. 10 is a flowchart of AF processing performed in a third embodiment (part 2).

A control procedure performed in the third embodiment will now be described. FIGS. 9 and 10 illustrate a flowchart of AF processing performed in the third embodiment. When power is supplied to the digital camera and a through image is obtained, the procedure is initiated by the CPU 40, and the face detection section 37 detects a face from the through image (step ST41).

Then, the face orientation determination section 45 determines the orientation of the face detected by the face detection section 37 (step ST42). Then, the CPU 40 determines whether or not the release button is depressed halfway (step ST43), and if step ST23 is negative, the procedure returns to step ST41. This will result in that a face is detected repeatedly from through images. If step ST43 is positive, a determination is made as to whether or not a face is detected (step ST44), and if step ST44 is negative, the AF processing section 30 performs focus adjustment such that the center of the angle of view is brought into focus (step ST45). If step ST24 is positive, a determination is made as to whether or not a plurality of faces is detected (step ST46).

If step ST46 is positive, one of the detected faces is selected for focus adjustment (step ST47). Then, the AF processing section 30 calculates the distance L between the digital camera and the selected face from the ratio of the selected face to the angle of view (step ST48). If step ST46 is negative, the procedure proceeds to step ST48.

Thereafter, the evaluation value calculation section 39 calculates an evaluation value representing the depth of field at the position of the face detected by the face detection section 37 based on the formula (1) above (step ST49).

Then, the AF processing section 30 determines whether or not the evaluation value representing the depth of field is less than or equal to the predetermined threshold value Th1 (step ST50). If step ST50 is negative, the AF processing section 30 performs focus adjustment such that the face selected in step ST47 is brought into focus (step ST51).

Figure 11:
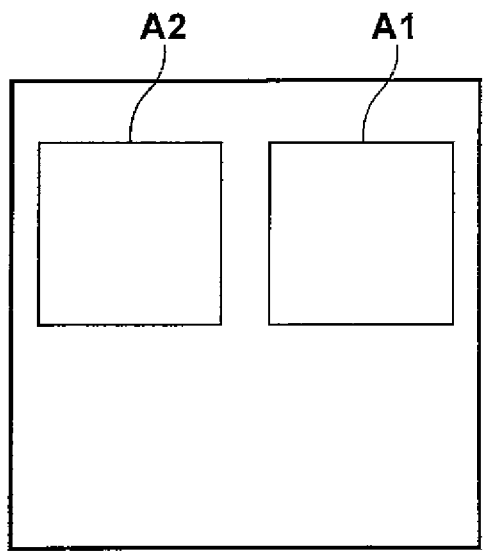
FIG. 11 illustrates how to set eye detection areas.

In the mean time, if step ST50 is positive, the eye detection section 38 sets the area for performing face orientation depended eye detecting with respect to the face detected in step ST47 (step ST52). FIG. 11 illustrates how to set eye detection areas. As shown in FIG. 11, if the face is determined to be oriented to left a region A1 within the face detection frame is set as the eye detection area, and if the face is determined to be oriented to right a region A2 within the face detection frame is set as the eye detection area. Thereafter, eye detection is performed within the determined eye detection area (step ST53), and focus adjustment is performed such that the detected eye is brought into focus (step ST54).

Following step ST45, step ST51, or step ST54, the CPU 40 determines whether or not the release button is depressed fully (step ST55). If step ST55 is negative, the procedure returns to step ST41. While, if step ST55 is positive, main photographing is performed (step ST56), and the procedure is terminated.

In this way, in the third embodiment, the orientation of a detected face is determined, and an eye detection area is determined according to the determined face orientation. This allows more efficient eye detection to be made, in particular, in the case where the face is slightly oriented to the side, thereby a time required for focus adjustment may be further reduced.

In the first to third embodiments, when a plurality of faces is detected, one of the faces is selected for focus adjustment. In some instances, however, only a single person is photographed, such as in portrait photographing. In such a case, the distance L may be calculated immediately without performing the determination as to whether or not a plurality of faces is detected.

So far, digital cameras according to the embodiments of the present invention have been described. A program for causing a computer to function as the means corresponding to the AF processing section 30, face detection section 37, eye detection section 38, evaluation value calculation section 39, and face orientation determination section 45, thereby causing the computer to perform procedures like those illustrated in FIGS. 2, 6, 7, 9, and 10 is another embodiment of the present invention. Further, a computer readable recording medium on which such program is recorded is still another embodiment of the present invention.

What is claimed is:

1. A focus adjustment apparatus comprising:
    a face detector that detects a person's face included in an image obtained by photographing;
    an eye detector that detects an eye of the person included in the image;
    an evaluation value calculator that determines an evaluation value representing a depth of field at a position of the detected face; and
    a focus adjuster that selectively performs the following based on the evaluation value: (a) focus adjustment to bring at least the detected face into focus without detecting the eye of the person with the eye detector, or (b) causing the eye detector to detect the eye of the person and performing focus adjustment to bring the detected eye into focus.

2. The focus adjustment apparatus according to claim 1, further comprising:
    a face orientation determiner that detects an orientation of the face,
    wherein the focus adjuster, when causing the eye detector to detect the eye of the person, determines the eye to be brought into focus according to the orientation of the face.

3. The focus adjustment apparatus according to claim 1, further comprising:
    a face orientation determiner that detects an orientation of the face,
    wherein the eye detector, when detecting the eye of the person, sets an area for detecting the eye, and detects the eye within the set area.

4. The focus adjustment apparatus according to claim 1 in a photographing apparatus, wherein the evaluation value calculator determines the evaluation value based on information of at least one of focal length, aperture value, distance to in-focus position of a lens constituting the photographing apparatus and a size of the face.

5. The focus adjustment apparatus according to claim 1, wherein, when a plurality of faces is detected, the face detector determines one of the faces to be brought into focus.

6. A focus adjustment method comprising:
- detecting a person's face included in an image obtained by photographing;
- calculating an evaluation value representing a depth of field at a position of the detected face; and
- selectively performing the following based on the evaluation value: (a) performing focus adjustment to bring at least the detected face into focus without detecting an eye of the person, or (b) detecting the eye of the person and performing focus adjustment to bring the detected eye into focus.

7. A computer readable recording medium on which a program for causing a computer to perform a focus adjustment method is recorded, the method comprising:
- detecting a person's face included in an image obtained by photographing;
- calculating an evaluation value representing a depth of field at a position of the detected face; and
- selectively performing the following based on the evaluation value: (a) performing focus adjustment to bring at least the detected face into focus without detecting an eye of the person, or (b) detecting the eye of the person and performing focus adjustment to bring the detected eye into focus.

* * * * *